(12) United States Patent
Rubin

(10) Patent No.: US 10,775,985 B2
(45) Date of Patent: Sep. 15, 2020

(54) DIALOG TRANSPARENCY ADJUSTABILITY

(71) Applicant: Konica Minolta Laboratory U.S.A., Inc., San Mateo, CA (US)

(72) Inventor: Howard Rubin, Boulder, CO (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 486 days.

(21) Appl. No.: 15/394,450

(22) Filed: Dec. 29, 2016

(65) Prior Publication Data

US 2018/0188929 A1 Jul. 5, 2018

(51) Int. Cl.
G06F 3/048 (2013.01)
G06F 3/0484 (2013.01)

(52) U.S. Cl.
CPC ........ G06F 3/04847 (2013.01); G06F 3/0484 (2013.01); G06F 2203/04804 (2013.01)

(58) Field of Classification Search
CPC .. G06F 3/0481; G06F 3/0482; G06F 3/04812; G06F 3/03545; G06F 17/246; H04W 76/10
See application file for complete search history.

(56) References Cited

U.S. PATENT DOCUMENTS

| | | | |
|---|---|---|---|
| 9,785,327 B1* | 10/2017 | Prud'Hommeaux | G06F 3/0483 |
| 2002/0129053 A1* | 9/2002 | Chan | G06F 17/246 715/213 |
| 2005/0125739 A1* | 6/2005 | Thompson | G06F 3/0481 715/778 |
| 2007/0124692 A1* | 5/2007 | Lindsay | G06F 3/0481 715/765 |
| 2007/0245256 A1* | 10/2007 | Boss | G06F 3/0481 715/768 |
| 2010/0169362 A1* | 7/2010 | Bulfani, Jr. | G06F 3/0482 707/769 |
| 2013/0019174 A1* | 1/2013 | Gil | G06F 3/04812 715/711 |
| 2013/0339904 A1* | 12/2013 | Geithner | G06F 3/0482 715/834 |
| 2015/0153571 A1* | 6/2015 | Ballard | H04W 76/10 345/8 |
| 2016/0234564 A1 | 8/2016 | Holyoak | |
| 2018/0088794 A1* | 3/2018 | Graham | G06F 3/03545 |

* cited by examiner

*Primary Examiner* — Haoshian Shih
(74) *Attorney, Agent, or Firm* — Osha Liang LLP

(57) ABSTRACT

A method for managing a dialog box. The method includes: displaying, on a display screen, the dialog box including a transparency GUI widget; obtaining a transparency setting specified by a user of the application, where the user interacts with the transparency GUI widget to specify the transparency setting; and adjusting the transparency of the dialog box on the display screen based on the transparency setting.

12 Claims, 4 Drawing Sheets

DIALOG TRANSPARENCY ADJUSTABILITY

BACKGROUND

Many applications are used to generate, edit, and/or display an electronic document (ED). The ED may include one or more text characters, clip art, animation, photos, video clips, audio clips, spreadsheets, websites, 3D renderings, slides and slide shows, etc. These applications often use dialog boxes to interact with (e.g., receive input from and/or display output to) users.

When a dialog box is displayed, the dialog box often covers (i.e., hides) at least a portion of the ED or any other content that might otherwise be visible when the dialog box is not present. The covering may be especially severe when the dialog box is being displayed on a computing device with a smaller display screen (e.g., smartphone). Accordingly, the ED and/or other content becomes more difficult to view and edit with the dialog box displayed. Regardless, users are still interested in interacting with applications through dialog boxes.

SUMMARY

In general, in one aspect, the invention relates to a method for managing a dialog box. The method comprises: displaying, on a display screen, the dialog box comprising a transparency GUI widget; obtaining a transparency setting specified by a user of the application, wherein the user interacts with the transparency GUI widget to specify the transparency setting; and adjusting the transparency of the dialog box on the display screen based on the transparency setting.

In general, in one aspect, the invention relates to a non-transitory computer readable medium (CRM) storing computer readable program code. The computer readable program code, when executed by a computer processor: displays, on a display screen, a dialog box comprising a transparency GUI widget; obtains a transparency setting specified by a user of the application, wherein the user interacts with the transparency GUI widget to specify the transparency setting; and adjusts the transparency of the dialog box based on the transparency setting.

In general, in one aspect, the invention relates to a computing device for managing a dialog box. The computing device comprises: a display screen; a memory; and a computer processor connected to the memory and that: displays, on the display screen, the dialog box comprising a transparency GUI widget; obtains a transparency setting specified by a user of the application, wherein the user interacts with the transparency GUI widget to specify the transparency setting; and adjusts the transparency of the dialog box on the display screen based on the transparency setting.

Other aspects of the invention will be apparent from the following description and the appended claims.

DETAILED DESCRIPTION

Figure 1:
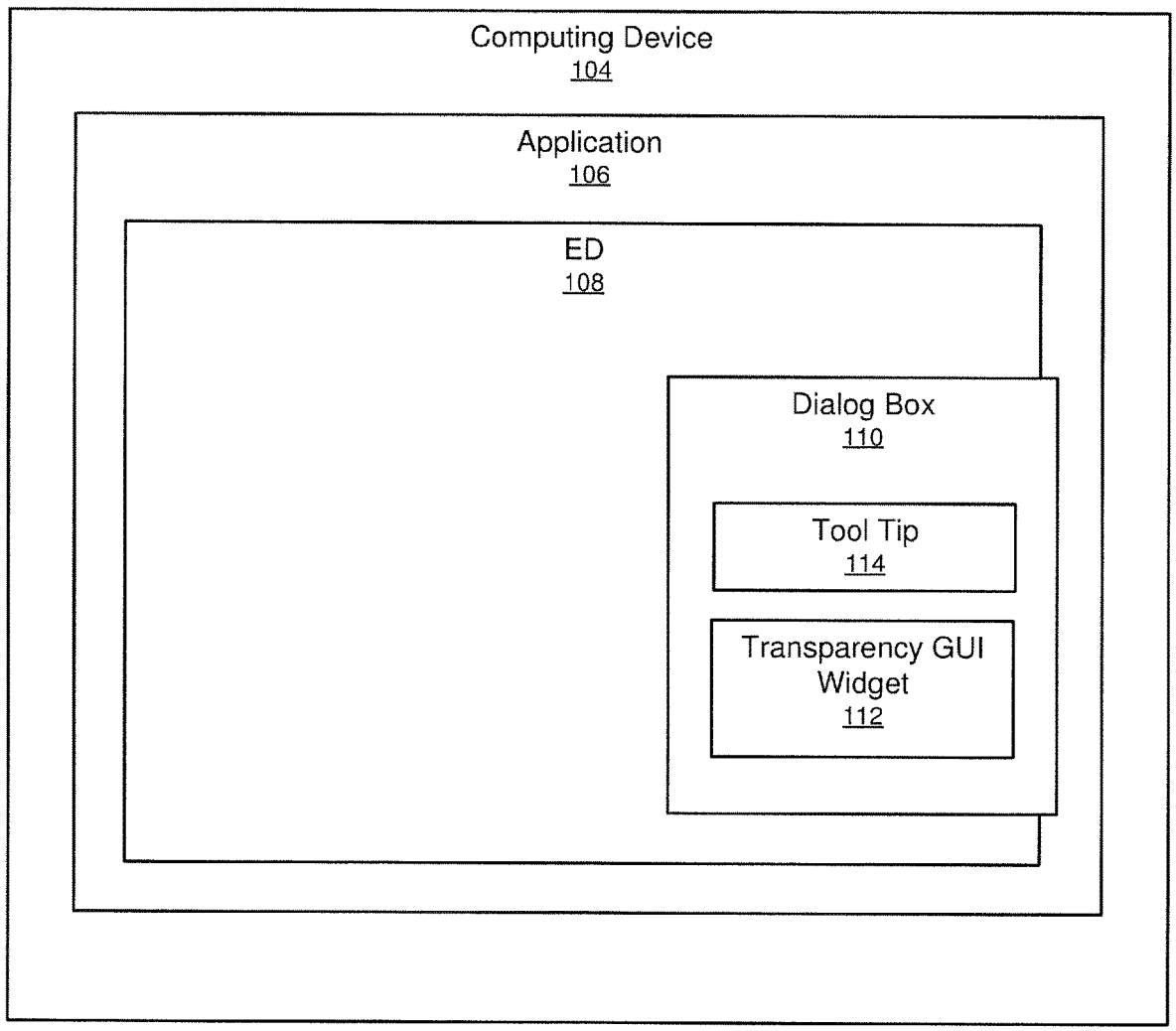
FIG. 1 shows a computing device in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a method, a system, and a non-transitory computer readable medium (CRM) for managing a dialog box. Specifically, a dialog box is displayed on a display screen. Accordingly, the dialog box may cover (i.e., hide) at least a portion of an ED also displayed on the display screen, another application displayed on the display screen, and/or other content that would otherwise be visible. The dialog box includes a transparency GUI widget that can be operated (e.g., manipulated) by a user of the application to specify a transparency setting. The transparency of the dialog box is then adjusted based on the user specified transparency setting, partially exposing the content behind the dialog box. The content may be the portion of the ED covered by the dialog box. Additionally or alternatively, the content may be another application covered by the dialog box. Additionally or alternatively, in the case of a transparent display screen (e.g., wearable glasses), the content may be the environment behind the display screen covered by the dialog box.

FIG. 1 shows a computing device (104) in accordance with one or more embodiments of the invention. The computing device (104) may be a personal computer (PC), a laptop, a tablet PC, a smartphone, a kiosk, a cable box, a server, virtual reality (VR) goggles, wearable glasses, etc. Accordingly, the computing device (104) may have one or more display screens for displaying EDs and/or dialog boxes to a user. The one or more display screens may be transparent. The computing device (104) may also have one or more input devices (e.g., keyboard, mouse, touchscreen, etc.) to receive user input.

In one or more embodiments of the invention, the computing device (104) executes an application (106). The application (106) may be operated by a user to generate, edit, and/or display an ED (108). For example, the application (106) may be a word processor, a web browser, a slide show generator, animation software, video editing software, an audio player, a photo viewer, an operating system, a debugger, an integrated development environment, etc. Accordingly, the ED (108) may include one or more text characters, graphics, photos, animation clips, video clips, webpages, spreadsheet cells, slides, slide shows, audio clips, lines of code, a 3D rendering for a VR world, etc. The ED (108) may be of any size (e.g., any number of pages). The ED (108) may be represented/defined using a document markup language (e.g., ODF, OOXML, etc.). The ED (108) may be a PDF file. In one or more embodiments, the application (106) does not display any ED.

In one or more embodiments of the invention, the application (106) includes a dialog box (110). Although FIG. 1 only shows one dialog box, the application (106) may have any number of dialog boxes. The dialog box (110) is used to display output to the user of the application (106) and/or receive input from the user of the application (106). The dialog box (110) may be displayed in response to a trigger or event. For example, the dialog box (110) may be displayed on a display screen in response to a user selecting a menu item or a button. As another example, the dialog box may be displayed on a display screen in response to the expiration of a timer, in response to the identification of an error, in response to a keystroke, etc. The dialog box (110) may include a feature/tool of the application. For example, the dialog box (110) may be the find and replace dialog box of a word processor. Additionally or alternatively, the dialog box may be a toolbar, a panel, or any other static control area.

In one or more embodiments of the invention, the dialog box (110) covers (i.e., hides) a portion of the ED (108). In other words, some content of the ED (108) may not be visible/editable because the dialog box (110) is being displayed. The dialog box (110), the ED (108), and the screen on which the dialog box (110) and the ED (108) are displayed may be of any size. Accordingly, in some embodiments, the dialog box (110) may cover the entire ED (108). In one or more embodiments of the invention, in the case of a transparent display screen, the dialog box (110) covers (i.e., hides) a portion of the environment behind the display screen that would otherwise be visible through the transparent display screen. In one or more embodiments of the invention, the dialog box (110) covers a portion of another visible application (not shown).

In one or more embodiments of the invention, the dialog box (110) may have multiple items. For example, the dialog box (110) may include a transparency GUI widget (112) and a tooltip (114). The dialog box (110) may have any number of additional GUI widgets (e.g., buttons, sliders, radio buttons, drop-down lists, text boxes, labels, etc.) (not shown) to implement a feature or tool of the application (106), collect input from the user, and/or display output (e.g., warning messages) to the user.

In one or more embodiments of the invention, the transparency GUI widget (112) is an interface for the user to specify a transparency setting. For example, the transparency GUI widget (112) may be a slider and each level on the slider corresponds to a different level (e.g., percentage) of transparency (e.g., 25%, 50%, etc.). As another example, the transparency GUI widget (112) may be a set of radio buttons, and each radio button in the set corresponds to a different level of transparency. As another example, the transparency GUI widget (112) may include a drop-down list, with different entries in the drop-down list corresponding to different levels of transparency. As yet another example, the transparency GUI widget (112) may include a button that is selected by the user, and then the user operates the scroll wheel of a mouse or a keyboard to specify a transparency setting.

In one or more embodiments of the invention, the application (106) allows the user to specify the type of transparency GUI widget (112) (e.g., slider vs. radio buttons vs. button and scroll wheel, etc.).

In one or more embodiments of the invention, the tooltip (114) provides the user with instructions on how to operate the transparency GUI widget (112) and/or how to specify a transparency setting. Accordingly, the tooltip (114) may be a label with the instructions.

In one or more embodiments of the invention, the application (106) adjusts the transparency of the dialog box (110) based on the transparency setting specified by the user. In other words, the application (106) may adjust the dialog box (110) to be fully or at least partially transparent. By making the dialog box (110) transparent, the content behind the dialog box (110) (e.g., ED (108), the environment behind the display screen, another visible application, etc.) may become fully or partially visible through the dialog box (110). When the dialog box (110) is initially displayed, the dialog box (110) may be 100% opaque. Alternatively, when the dialog box (110) is initially displayed, the dialog box may be partially (e.g., 30%) transparent. Once the transparency of the dialog box (110) is adjusted, the dialog box (110) may retain the transparency setting even if the dialog box (110) moves around the screen of the computing device (104). The user may specify a different transparency setting (i.e., increase or decrease the transparency level) at any time to change the transparency of the dialog box (110). This transparency setting may be applied to any additional dialog boxes (not shown) that are later displayed. Additionally or alternatively, each dialog box has its own transparency GUI widget. Accordingly, it is possible for multiple dialog boxes to be displayed simultaneously, with different dialog boxes displayed with different levels of transparency.

Figure 2:
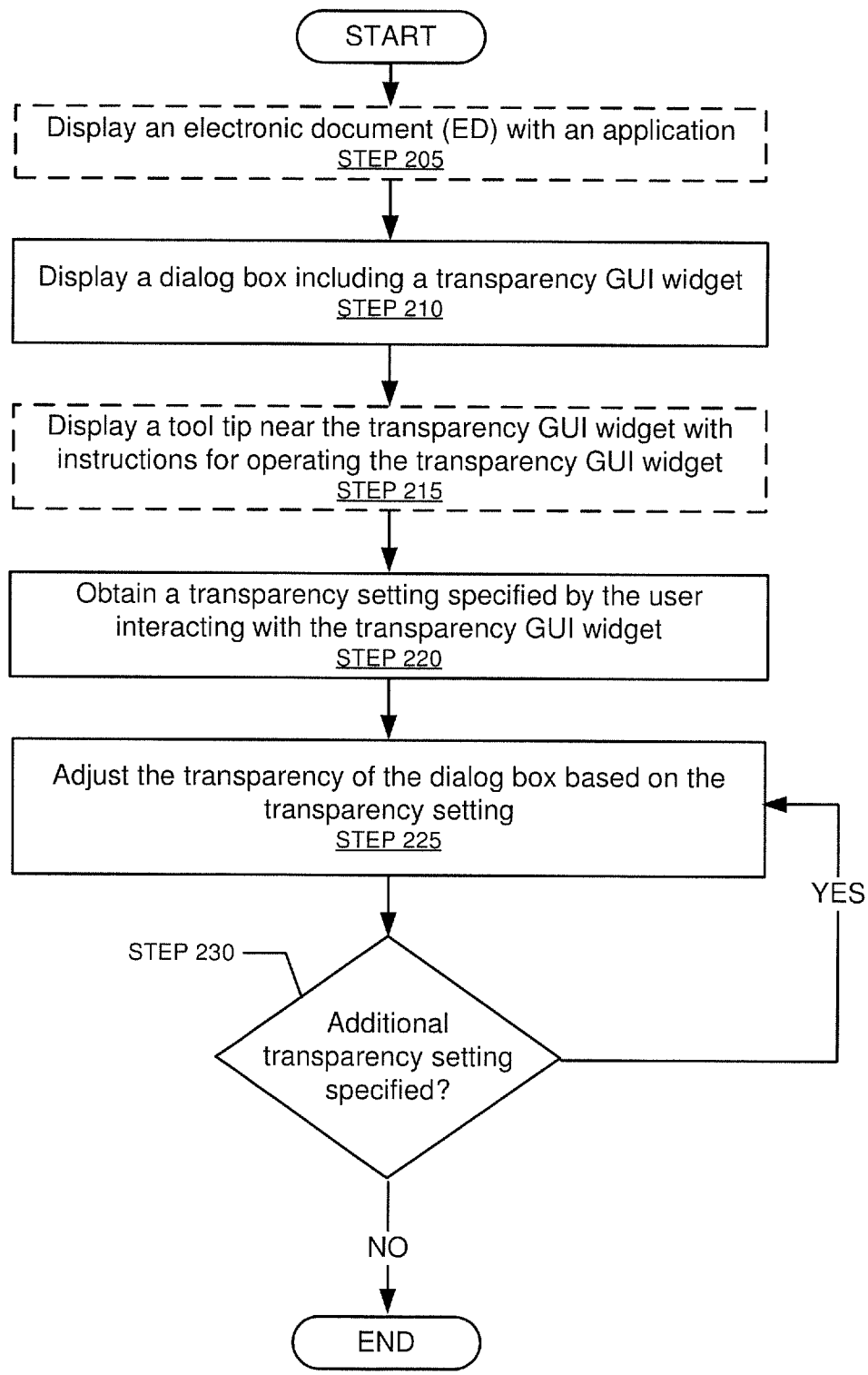
FIG. 2 shows a flowchart in accordance with one or more embodiments of the invention.

FIG. 2 shows a flowchart in accordance with one or more embodiments of the invention. The flowchart depicts a process for managing a dialog box. One or more of the steps in FIG. 2 may be performed by the components of the computing device (104), discussed above in reference to FIG. 1A. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an ED is displayed on a display screen (STEP 205). The ED may include one or more text characters, graphics, photos, animation clips, video clips, webpages, spreadsheet cells, slides, slide shows, audio clips, lines of code for debugging, a 3D rendering for a VR world, etc. The ED may be downloaded from the internet. The ED may be generated by the user. The ED may be displayed by an application configured to generate, edit, and/or display the ED. For example, the ED may be a webpage and the application may be a web browser. The ED may be represented/defined using a document markup language (e.g., ODF, OOXML, etc.). The ED may be a PDF file. In one or more embodiments, STEP 205 is optional.

In STEP 210, a dialog box is displayed on the display screen. In one or more embodiments, the dialog box is displayed simultaneously with the ED. Additionally or alternatively, the dialog box is displayed without any ED being displayed. The dialog box may be displayed in response to a user attempting to access a feature or tool of the application. The dialog box may be displayed in response to an error, an expired timer, an alert from the operating system, etc. The dialog box may be 100% opaque when it is initially displayed and thus cover (i.e., hide) all or some content (e.g., also displayed ED, environment behind the transparent displays screen, etc.). Alternatively, the dialog box may be some level of transparency (e.g., 70%) when it is initially displayed.

In one or more embodiments, the dialog box includes multiple GUI widgets. For example, the dialog box may include buttons, textboxes, drop-down lists, radio-buttons, sliders, labels, etc. The GUI widgets may be used to display output to the user and/or receive input from the user. The GUI widgets include a transparency GUI widget. As discussed above, the transparency GUI widget is an interface by which a user of the application can specify a transparency setting for the dialog box. The transparency GUI widget may be a slider, a button, a set of radio buttons, a drop-down list, etc.

In STEP 215, a tooltip is displayed in the dialog box near the transparency GUI widget. The tooltip may be a label with instructions for the user as to how to operate the transparency GUI widget and specify the transparency setting for the dialog box. The tooltip may have a different background color than the rest of the dialog box. In one or more embodiments, STEP 215 is optional.

In STEP 220, a transparency setting is obtained from the user. Specifically, the transparency setting may be collected from the transparency GUI widget that has been manipulated by the user. Additionally or alternatively, the transparency setting may be collected from keystrokes executed by the user or based on rolls of the mouse scroll wheel executed by the user.

In STEP 225, the transparency of the dialog box is adjusted based on the transparency setting. The user may specify the dialog box is to be, for example, 25% transparent, 55% transparent, etc. In one or more embodiments of the invention, the transparency of the dialog box is gradually adjusted (i.e., adjusted in stages) from its current transparency level to the transparency setting specified by the user. The transparency of the dialog box may be continuously adjusted or adjusted in discrete steps. In one or more embodiments, the transparency of the dialog box is adjusted in a single step (i.e., not in stages) from its current transparency level to the transparency setting specified by the user. The content behind the dialog box (e.g., a portion of the ED, the environment behind the transparent display screen, etc.) becomes increasingly visible as the dialog box becomes increasingly transparent. In one or more embodiments, the current transparency setting and/or the target transparency setting are displayed within the dialog box.

In one or more embodiments of the invention, the transparency of the dialog box is adjusted in real-time. In other words, while the user is manipulating the transparency GUI widget (e.g., moving a slider, rolling a mouse scroll wheel, etc.), the transparency of the dialog box is immediately adjusted in response (i.e., the adjustment begins before the user has finished the full extent of the manipulation).

In one or more embodiments of the invention, all portions of the dialog box except the transparency GUI widget are adjusted based on the transparency setting (i.e., the transparency of the transparency GUI widget does not change). In one or more embodiments of the invention, the entire dialog box including the transparency GUI widget is adjusted based on the transparency setting. In one or more embodiments, the one or more GUI widgets of the dialog box remain operational even when the dialog box is partially transparent.

In STEP 230, it is determined whether an additional transparency setting has been specified by the user. For example, the user might not be content with the previous transparency setting and thus may specified a new transparency setting using the transparency GUI widget. If an additional transparency setting is specified by the user, the process returns to STEP 225. Otherwise, the process may end.

Those skilled in the art, having the benefit of this detailed description, will appreciate that the process depicted in FIG. 2 may be repeated for each dialog box displayed. Further, if a dialog box is closed (i.e., removed from display) and later re-displayed, the dialog box may retain the last transparency setting.

Figure 3A:
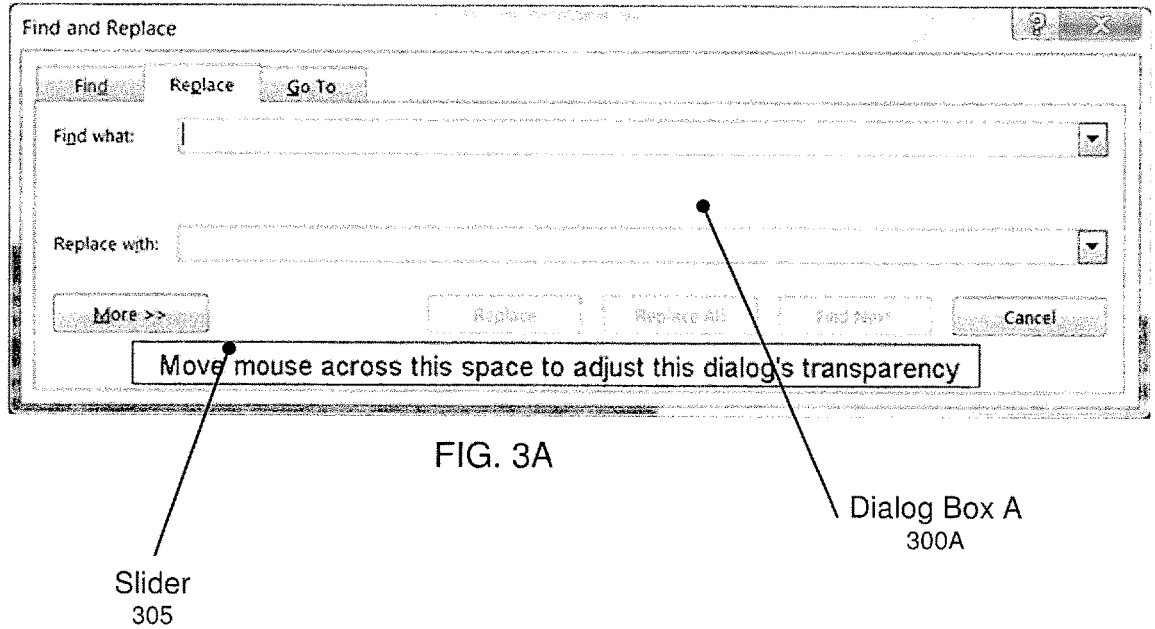
FIG. 3A and FIG. 3B show examples in accordance with one or more embodiments of the invention.
Figure 3B:
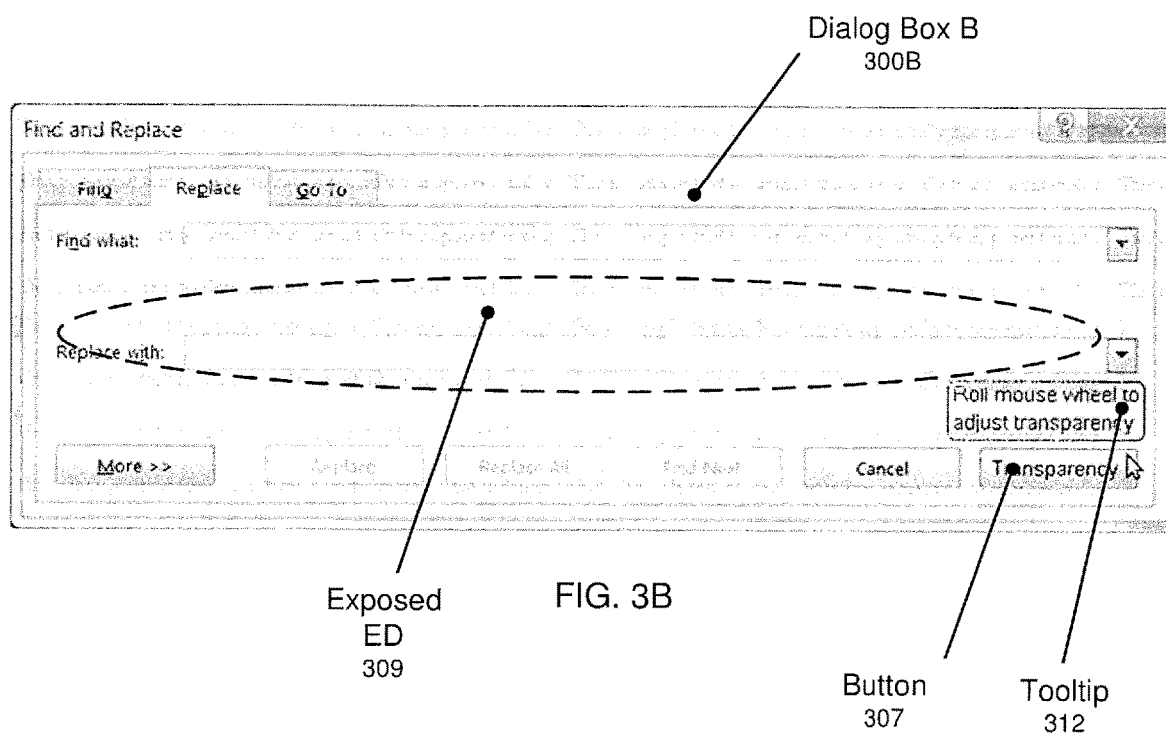

FIG. 3A and FIG. 3B show examples in accordance with one or more embodiments of the invention. Specifically, FIG. 3A shows dialog box A (300A), which is a find and replace dialog box. Assume dialog box A (300A) is covering (i.e., hiding) a portion of a displayed ED. In addition to various buttons and textboxes, dialog box A (300A) includes a transparency GUI widget (i.e., slider (305)) for specifying a transparency setting. Specifically, the user moves the mouse cursor along the slider (305) to specify a transparency setting (e.g., 45% transparent). Dialog box A (300A) is then made 45% transparent, partially exposing the content of the ED behind dialog box A (300A).

FIG. 3B shows dialog box B (300B), which is also a find and replace dialog box. Assume dialog box B (300B) is covering (i.e., hiding) a portion of a displayed ED. In addition to various buttons and textboxes, dialog box B (300B) includes a transparency GUI widget (i.e., button (307)) and a tooltip (312) with instructions for the user on how to operate the transparency GUI widget and specify a transparency setting. The tooltip (312) has a different color than the rest of dialog box B (300B). As also shown in FIG. 3B, dialog box B (300B) has been made partially transparent using the transparency GUI widget, effectively exposing the content (309) of the ED behind dialog box B (300B).

Various embodiments of the invention may have one or more of the following advantages: the ability to specify a transparency setting for a dialog box; the ability to specify a transparency setting for a dialog box independent of other dialog boxes of the same application; the ability to specify a transparency setting of the dialog box from the dialog box itself; the ability to specify a transparency setting using a transparency GUI widget; the ability to not adjust the transparency of the transparency GUI widget even though the transparency of the rest of the dialog box is adjusted; the ability to adjust transparency in multiple stages or a single step; the ability to display instructions for a user with a tooltip; etc.

Figure 4:
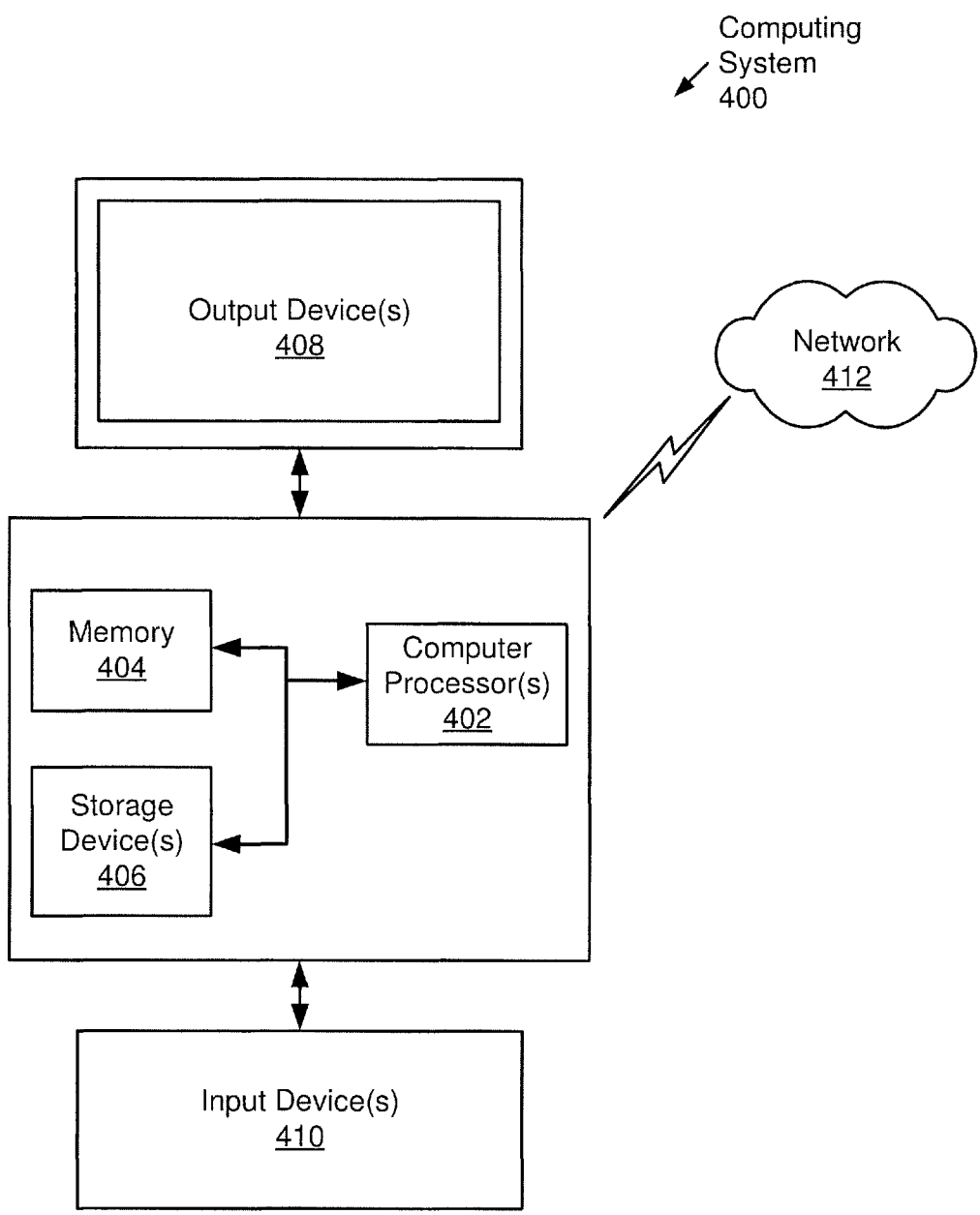
FIG. 4 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a dialog box, comprising:
   displaying, on a display screen, the dialog box comprising a transparency GUI widget;
   obtaining a transparency setting specified by a user of an application, wherein the user interacts with the transparency GUI widget to specify the transparency setting; and
   adjusting the transparency of the dialog box on the display screen based on the transparency setting, wherein
   an entirety of the dialog box is adjusted based on the transparency setting,
   the transparency GUI widget is an invisible slider that the user hovers a mouse cursor along to specify the transparency setting, and
   a tooltip with an instruction for specifying the transparency setting is displayed over the invisible slider.

2. The method of claim 1, further comprising:
   displaying an electronic document (ED) on the display screen,
   wherein adjusting the transparency at least partially exposes content covered by the dialog box,
   wherein the dialog box at least partially covers the ED on the displays screen, and
   wherein the content is the portion of the ED covered by the dialog box.

3. The method of claim 1, wherein adjusting the transparency at least partially exposes content covered by the dialog box, wherein the display screen is transparent, and wherein the content is the environment behind the display screen covered by the dialog box.

4. The method of claim 1, wherein the dialog box is initially displayed as 50% transparent.

5. The method of claim 1, wherein the dialog box is a find and replace dialog box.

6. A computing device for managing a dialog box, comprising:
   a display screen;
   a memory; and
   a computer processor connected to the memory and that:
      displays, on the display screen, the dialog box comprising a transparency GUI widget;
      obtains a transparency setting specified by a user of an application, wherein the user interacts with the transparency GUI widget to specify the transparency setting; and
      adjusts the transparency of the dialog box on the display screen based on the transparency setting, wherein
   an entirety of the dialog box is adjusted based on the transparency setting,
   the transparency GUI widget is an invisible slider that the user hovers a mouse cursor along to specify the transparency setting, and
   the computer processor displays, over the invisible slider, a tooltip with an instruction for specifying the transparency setting.

7. The computing device of claim 6, wherein the computer processor also:
   displays an electronic document (ED) on the display screen,
   wherein adjusting the transparency at least partially exposes content covered by the dialog box,
   wherein the dialog box at least partially covers the ED, and
   wherein the content is the portion of the ED covered by the dialog box.

8. The computing device of claim 6, wherein adjusting the transparency at least partially exposes content covered by the dialog box, wherein the display screen is transparent, and wherein the content is the environment behind the display screen covered by the dialog box.

9. A non-transitory computer readable medium (CRM) storing computer readable program code executed by a computer processor that:
   displays, on a display screen, a dialog box comprising a transparency GUI widget;
   obtains a transparency setting specified by a user of an application, wherein the user interacts with the transparency GUI widget to specify the transparency setting; and
   adjusts the transparency of the dialog box based on the transparency setting, wherein
   an entirety of the dialog box is adjusted based on the transparency setting,
   the transparency GUI widget is an invisible slider that the user hovers a mouse cursor along to specify the transparency setting, and
   the computer processor displays, over the invisible slider, a tooltip with an instruction for specifying the transparency setting.

10. The non-transitory CRM of claim 9, wherein the computer readable program code executed by the computer processor also:
- displays an electronic document (ED) on the display screen,
- wherein adjusting the transparency at least partially exposes content covered by the dialog box,
- wherein the dialog box at least partially covers the ED on the display screen, and
- wherein the content is the portion of the ED covered by the dialog box.

11. The non-transitory CRM of claim 9, wherein adjusting the transparency at least partially exposes content covered by the dialog box, wherein the display screen is transparent, and wherein the content is the environment behind the display screen covered by the dialog box.

12. The non-transitory CRM of claim 9, wherein the dialog box is initially displayed as 50% transparent.

* * * * *